(12) United States Patent
Keller et al.

(10) Patent No.: US 12,072,116 B2
(45) Date of Patent: Aug. 27, 2024

(54) METHOD AND SYSTEM FOR CONTROLLING ENERGY TRANSFER OF A THERMAL ENERGY EXCHANGER

(71) Applicant: BELIMO HOLDING AG, Hinwil (CH)

(72) Inventors: Jürg Keller, Wangen bei Olten (CH); Armon Hänseler, Neerach (CH); Forest Reider, Seegraeben (CH); Stefan Mischler, Wald (CH)

(73) Assignee: BELIMO HOLDING AG, Hinwil (CH)

( * ) Notice: Subject to any disclaimer, the term of this patent is extended or adjusted under 35 U.S.C. 154(b) by 869 days.

(21) Appl. No.: 17/054,856

(22) PCT Filed: Jun. 11, 2019

(86) PCT No.: PCT/EP2019/065124
§ 371 (c)(1),
(2) Date: Nov. 12, 2020

(87) PCT Pub. No.: WO2019/238631
PCT Pub. Date: Dec. 19, 2019

(65) Prior Publication Data
US 2021/0215372 A1 Jul. 15, 2021

(30) Foreign Application Priority Data
Jun. 12, 2018 (CH) ...................... 00750/18

(51) Int. Cl.
*F24F 11/64* (2018.01)
*F24F 11/46* (2018.01)
(Continued)

(52) U.S. Cl.
CPC .............. *F24F 11/64* (2018.01); *F24F 11/46* (2018.01); *G01F 1/125* (2013.01);
(Continued)

(58) Field of Classification Search
CPC .. F24F 11/64; F24F 11/46; F24F 11/83; F24F 2110/10; G01F 1/125; F24D 2220/044; G05B 15/02; G05B 2219/2614
(Continued)

(56) References Cited

U.S. PATENT DOCUMENTS

| 5,525,231 | A | * | 6/1996 | Ho | ........................ | C02F 1/006 |
| | | | | | | 210/903 |
| 6,221,594 | B1 | * | 4/2001 | Burrell | .................. | C12Q 1/689 |
| | | | | | | 536/23.1 |

(Continued)

FOREIGN PATENT DOCUMENTS

| CH | 706736 A1 | 1/2014 |
| CN | 103228996 A | 7/2013 |

(Continued)

OTHER PUBLICATIONS

International Search Report of PCT/EP2019/065124 dated Aug. 26, 2019 [PCT/ISA/210].
(Continued)

*Primary Examiner* — Claire E Rojohn, III
(74) *Attorney, Agent, or Firm* — Sughrue Mion, PLLC

(57) ABSTRACT

For controlling energy transfer (Q) of a thermal energy exchanger of an HVAC system, a control system determines flow-dependent model parameters (M) for modelling performance of the thermal energy exchanger, using a plurality of measurement data sets, each measurement data set including for a respective measurement time a value of a measured flow of fluid (Φact), a value of a measured supply temperature (Tsup) of the fluid, and a value of the measured return temperature (Tret) of the fluid. The control system calculates an estimated energy transfer (Qest) of the thermal energy exchanger, using the flow-dependent model parameters (M), and controls (S4) the energy transfer (Q) of the thermal energy exchanger by regulating (S5) the flow of fluid (Φ)

(Continued)

through the thermal energy exchanger, using the estimated energy transfer (Qest).

20 Claims, 4 Drawing Sheets

(51) Int. Cl.
*F24F 11/83* (2018.01)
*F24F 110/10* (2018.01)
*G01F 1/12* (2006.01)
*G05B 15/02* (2006.01)

(52) U.S. Cl.
CPC ......... *F24D 2220/044* (2013.01); *F24F 11/83* (2018.01); *F24F 2110/10* (2018.01); *G05B 15/02* (2013.01); *G05B 2219/2614* (2013.01)

(58) Field of Classification Search
USPC ........................................................ 165/200
See application file for complete search history.

(56) References Cited

U.S. PATENT DOCUMENTS

| | | | | |
|---|---|---|---|---|
| 7,632,913 | B2 * | 12/2009 | Campman | C08G 64/205 528/196 |
| 9,631,831 | B2 * | 4/2017 | Thuillard | F24F 11/84 |
| 9,723,762 | B1 * | 8/2017 | Ross | F24F 13/222 |
| 9,982,955 | B2 * | 5/2018 | Friedl | F24F 11/46 |
| 10,712,042 | B2 * | 7/2020 | Passoni | G05D 23/1919 |
| 2014/0222218 | A1 | 8/2014 | D'silva et al. | |
| 2015/0153119 | A1 | 6/2015 | Friedl et al. | |
| 2015/0334878 | A1 | 11/2015 | Long et al. | |
| 2018/0195753 | A1 * | 7/2018 | Reider | F24F 11/62 |
| 2023/0146901 | A1 * | 5/2023 | Reider | G01N 29/4418 702/54 |
| 2023/0349577 | A1 * | 11/2023 | Mischler | F24F 11/84 |
| 2023/0417443 | A1 * | 12/2023 | Fux | F24F 11/85 |

FOREIGN PATENT DOCUMENTS

| | | |
|---|---|---|
| EP | 3141823 A1 | 3/2017 |
| WO | 2014/094215 A1 | 6/2014 |
| WO | 2015/171196 A1 | 11/2015 |
| WO | 2017/036674 A1 | 3/2017 |

OTHER PUBLICATIONS

Written Opinion of PCT/EP2019/065124 dated Aug. 26, 2019 [PCT/ISA/237].
Swiss Search Report of CH00750/18 dated Sep. 24, 2018.
Communication dated Oct. 9, 2021 from the China National Intellectual Property Administration in CN Application No. 201980038515.1.
European Office Action dated Oct. 23, 2023 in Application No. 19 731 896.7.

* cited by examiner

METHOD AND SYSTEM FOR CONTROLLING ENERGY TRANSFER OF A THERMAL ENERGY EXCHANGER

CROSS REFERENCE TO RELATED APPLICATIONS

This application is a National Stage of International Application No. PCT/EP2019/065124 filed on Jun. 11, 2019, claiming priority based on Swiss Patent Application No. 00750/18 filed on Jun. 12, 2018.

FIELD OF THE INVENTION

The present invention relates to a method and a control system for controlling energy transfer of a thermal energy exchanger. Specifically, the present invention relates to a method and a control system for controlling energy transfer of a thermal energy exchanger of an HVAC system.

BACKGROUND OF THE INVENTION

By regulating the flow of fluid through a thermal energy exchanger of an HVAC system, it is possible to adjust the amount of energy transferred by the thermal energy exchanger to a secondary side of the thermal energy exchanger. For example, the energy exchange or the power transfer, correspondingly, is adjusted by regulating the amount of energy delivered by the heat exchanger to heat or cool a room in a building, or by regulating the amount of energy drawn by a chiller for cooling purposes. While the fluid transport through the fluid circuit of the HVAC system is driven by one or more pumps or fans, the flow is typically regulated by varying the orifice (opening) or position of valves, e.g. manually or by way of actuators. The efficiency of thermal energy exchangers is reduced at high flow rates where the fluid rushes at an increased rate through the thermal energy exchangers, without resulting in a significant increase in energy exchange. Moreover, the actual energy transfer characteristics of thermal energy exchangers in an HVAC system depend on building or plant characteristics and various environmental conditions such as temperature, humidity, etc. Basically, the energy transfer Q of a thermal energy exchanger can be calculated on the basis of the flow of fluid ØD through the thermal energy exchanger (flow rate) and the temperature differential $\Delta T$ over the energy exchanger, i.e. the difference between the inlet temperature $T_{in}$ of the fluid entering and the outlet temperature Tor the fluid exiting the thermal energy exchanger. In stable/static scenarios, calculating of the energy transfer $q \approx \Phi \cdot \Delta T$ is sufficiently accurate for controlling the energy transfer. However, in an HVAC system and scenario with numerous transient events and processes, e.g. frequently changing flow rates and temperature differentials $\Delta T$, this basic calculation of energy transfer $Q \approx \Phi \cdot \Delta T$ alone is often not sufficient for accurate control of energy transfer.

WO 2017/036674 describes a method of operating a thermal energy exchanger by recording measurement data sets with time-specific data values defining a normalized energy transfer which represents the thermal energy transferred in the thermal energy exchanger from thermal transfer fluid to air, normalized by at least one air side variable; calculating for the measurement data sets normalized data points defined by the normalized energy transfer; determining for the thermal energy exchanger a characteristic energy transfer curve which fits the normalized data points and which indicates an expected energy transfer in the thermal energy exchanger from the thermal transfer fluid to the air; and operating the thermal energy exchanger on the characteristic energy transfer curve.

US 2015/153119 describes a method for operating a heat exchanger by measuring at least three of the four temperatures at the entries and exits of the heat exchanger's primary and secondary sides; determining a saturation level of the heat exchanger from the measured temperatures; and controlling the operation of the heat exchanger, using the saturation level.

US 2014/222218 describes a method for operating an HVAC system by determining empirically for an energy consumer of the HVAC system the dependence of the flow of energy and/or the temperature differential $\Delta T$, between the supply temperature and the return temperature, on the volumetric flow rate through the energy consumer; and operating the HVAC system in accordance with the determined dependence(s).

WO 2015/171196 describes a method for determining the thermal energy flow in an HVAC system by measuring one or more variables of the HVAC system, e.g. an entry and/or exit temperature of the HVAC system; inputting the measured variables into a virtual fluid flow system to determine the fluid flow of the HVAC system, using a mathematical or physical model; and determining the thermal energy flow using the fluid flow determined by the virtual fluid flow system and a sensed temperature.

SUMMARY OF THE INVENTION

It is an object of this invention to provide a method and a control system for controlling energy transfer of a thermal energy exchanger of an HVAC system, which method and control system do not have at least some of the disadvantages of the prior art. In particular, it is an object of the present invention to provide a method and a control system for controlling energy transfer of a thermal energy exchanger of an HVAC system with numerous transient events and processes.

According to the present invention, these objectives are achieved through the features of the independent claims. In addition, further advantageous embodiments follow from the dependent claims and the description.

According to the present invention, the above-mentioned objects are particularly achieved in that for controlling energy transfer of a thermal energy exchanger of an HVAC system, a flow sensor measures the flow of fluid through the thermal energy exchanger. A first temperature sensor measures a supply temperature of the fluid in a supply pipe connected to an entry of the thermal energy exchanger, and a second temperature sensor measures a return temperature of the fluid in a return pipe connected to an exit of the thermal energy exchanger. A control system determines flow-dependent model parameters for modelling performance of the thermal energy exchanger, using one or more measurement data sets, whereby each measurement data set includes for a respective measurement time a value of the measured flow of fluid, a value of the measured supply temperature of the fluid, and a value of the measured return temperature of the fluid. Using the flow-dependent model parameters, the control system calculates an estimated energy transfer of the thermal energy exchanger, and controls the energy transfer of the thermal energy exchanger by regulating the flow of fluid through the thermal energy exchanger, using the estimated energy transfer.

As one skilled in the art will understand, the term "flow" as used herein also refers to "flow rate", accordingly, the flow of fluid measured by a flow sensor relates to the flow rate of fluid measured by the flow sensor, for example. Likewise, the term "energy transfer" as used herein also refers to "energy transfer rate", accordingly, the energy transfer of a thermal energy exchanger relates to the energy transfer rate of the thermal energy exchanger, for example.

In an embodiment, determining the flow-dependent model parameters comprises the control system determining a delay time in the supply pipe for the fluid to move from the first temperature sensor to the thermal energy exchanger, and determining a delay time in the return pipe for the fluid to move from the thermal energy exchanger to the second temperature sensor.

In a further embodiment, determining the flow-dependent model parameters comprises the control system determining an energy transfer coefficient for the thermal energy exchanger.

In an embodiment, determining the flow-dependent model parameters comprises the control system determining a secondary temperature associated with a secondary side of the thermal energy exchanger.

In an embodiment, determining the flow-dependent model parameters comprises the control system determining an exchange time for the fluid to replace the total fluid content of the thermal energy exchanger.

In a further embodiment, determining the flow-dependent model parameters comprises the control system determining an estimated return temperature of the fluid in the return pipe, and setting the flow-dependent model parameters such as to minimize a difference between the estimated return temperature and the measured return temperature.

In an embodiment, calculating the estimated energy transfer comprises the control system determining an estimated energy transport extracted in the thermal energy exchanger from the fluid, determining an energy content stored in the thermal energy exchanger, and calculating the estimated energy transfer as a difference from the energy transport and the energy content.

In a further embodiment, determining the estimated energy transport comprises the control system determining an input temperature of the thermal energy exchanger, using the measured supply temperature and a delay time in the supply pipe for the fluid to move from the first temperature sensor to the thermal energy exchanger, determining an output temperature of the thermal energy exchanger, using the measured return temperature and a delay time in the return pipe for the fluid to move from the thermal energy exchanger to the second temperature sensor, and calculating the estimated energy transport from the measured flow of fluid, the determined input temperature of the thermal energy exchanger, and the determined output temperature of the thermal energy exchanger.

In an embodiment, the control system receives a target energy transfer and controls the energy transfer by regulating the flow of fluid through the thermal energy exchanger based on a comparison of the target energy transfer and the estimated energy transfer.

In a further embodiment, regulating the flow of fluid through the thermal energy exchanger comprises the control system determining a target flow based on the comparison of the target energy transfer and the estimated energy transfer, and regulating the flow of fluid through the thermal energy exchanger based on a comparison of the target flow and the measured flow of fluid.

In addition to a method of controlling energy transfer of a thermal energy exchanger in an HVAC system, the present invention also relates to a control system for controlling energy transfer of a thermal energy exchanger of an HVAC system. The control system comprises at least one processor configured to obtain from a flow sensor, a measured flow of fluid through the thermal energy exchanger; obtain from a first temperature sensor, a supply temperature of the fluid in a supply pipe connected to an entry of the thermal energy exchanger; obtain from a second temperature sensor, a return temperature of the fluid in a return pipe connected to an exit of the thermal energy exchanger; determine flow-dependent model parameters for modelling performance of the thermal energy exchanger, using one or more measurement data sets, each measurement data set including for a respective measurement time a value of the measured flow of fluid, a value of the measured supply temperature of the fluid, and a value of the measured return temperature of the fluid; calculate an estimated energy transfer of the thermal energy exchanger, using the flow-dependent model parameters; and control the energy transfer of the thermal energy exchanger by regulating the flow of fluid through the thermal energy exchanger, using the estimated energy transfer.

In an embodiment, the processor is further configured to determine with the flow-dependent model parameters a delay time in the supply pipe for the fluid to move from the first temperature sensor to the thermal energy exchanger, and a delay time in the return pipe for the fluid to move from the thermal energy exchanger to the second temperature sensor.

In an embodiment, the processor is further configured to determine with the flow-dependent model parameters an energy transfer coefficient for the thermal energy exchanger.

In an embodiment, the processor is further configured to determine with the flow-dependent model parameters a secondary temperature associated with a secondary side of the thermal energy exchanger.

In an embodiment, the processor is further configured to determine with the flow-dependent model parameters an exchange time for the fluid to replace the total fluid content of the thermal energy exchanger.

In an embodiment, the processor is further configured to determine the flow-dependent model parameters by determining an estimated return temperature of the fluid in the return pipe, and setting the flow-dependent model parameters such as to minimize a difference between the estimated return temperature and the measured return temperature.

In an embodiment, the processor is further configured to calculate the estimated energy transfer by determining an estimated energy transport, extracted in the thermal energy exchanger from the fluid, determining an energy content stored in the thermal energy exchanger, and calculating the estimated energy transfer as a difference from the energy transport and the energy content.

In an embodiment, the processor is further configured to determine the estimated energy transport by determining an input temperature of the thermal energy exchanger, using the measured supply temperature and a delay time in the supply pipe for the fluid to move from the first temperature sensor to the thermal energy exchanger, determining an output temperature of the thermal energy exchanger, using the measured return temperature and a delay time in the return pipe for the fluid to move from the thermal energy exchanger to the second temperature sensor, and calculating the estimated energy transport from the measured flow of fluid, the input temperature of the thermal energy exchanger, and the output temperature of the thermal energy exchanger.

In an embodiment, the processor is further configured to receive a target energy transfer, and control the energy transfer by regulating the flow of fluid through the thermal energy exchanger based on a comparison of the target energy transfer and the estimated energy transfer.

In an embodiment, the processor is further configured to regulate the flow of fluid through the thermal energy exchanger by determining a target flow based on the comparison of the target energy transfer and the estimated energy transfer, and regulate the flow of fluid through the thermal energy exchanger based on a comparison of the target flow and the measured flow of fluid.

In addition to a method and a control system for controlling energy transfer of a thermal energy exchanger 1n an HVAC system, the present invention also relates to a computer program product comprising a non-transient computer-readable medium having stored thereon computer program code configured to control a processor of a control system for controlling energy transfer of a thermal energy exchanger of an HVAC system. The computer program code is configured to control the processor such that the processor performs the following steps: obtaining from a flow sensor, a measured flow of fluid through the thermal energy exchanger; obtaining from a first temperature sensor, a supply temperature of the fluid in a supply pipe connected to an entry of the thermal energy exchanger; obtaining from a second temperature sensor, a return temperature of the fluid in a return pipe connected to an exit of the thermal energy exchanger; determining flow-dependent model parameters for modelling performance of the thermal energy exchanger, using one or more measurement data sets, each measurement data set including for a respective measurement time a value of the measured flow of fluid, a value of the measured supply temperature of the fluid, and a value of the measured return temperature of the fluid; calculating an estimated energy transfer of the thermal energy exchanger, using the flow-dependent model parameters; and controlling the energy transfer of the thermal energy exchanger by regulating the flow of fluid through the thermal energy exchanger, using the estimated energy transfer.

In an embodiment, the computer program code is further configured to control the processor such that the processor performs steps of the method of controlling opening of a valve in an HVAC system, as outlined above.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
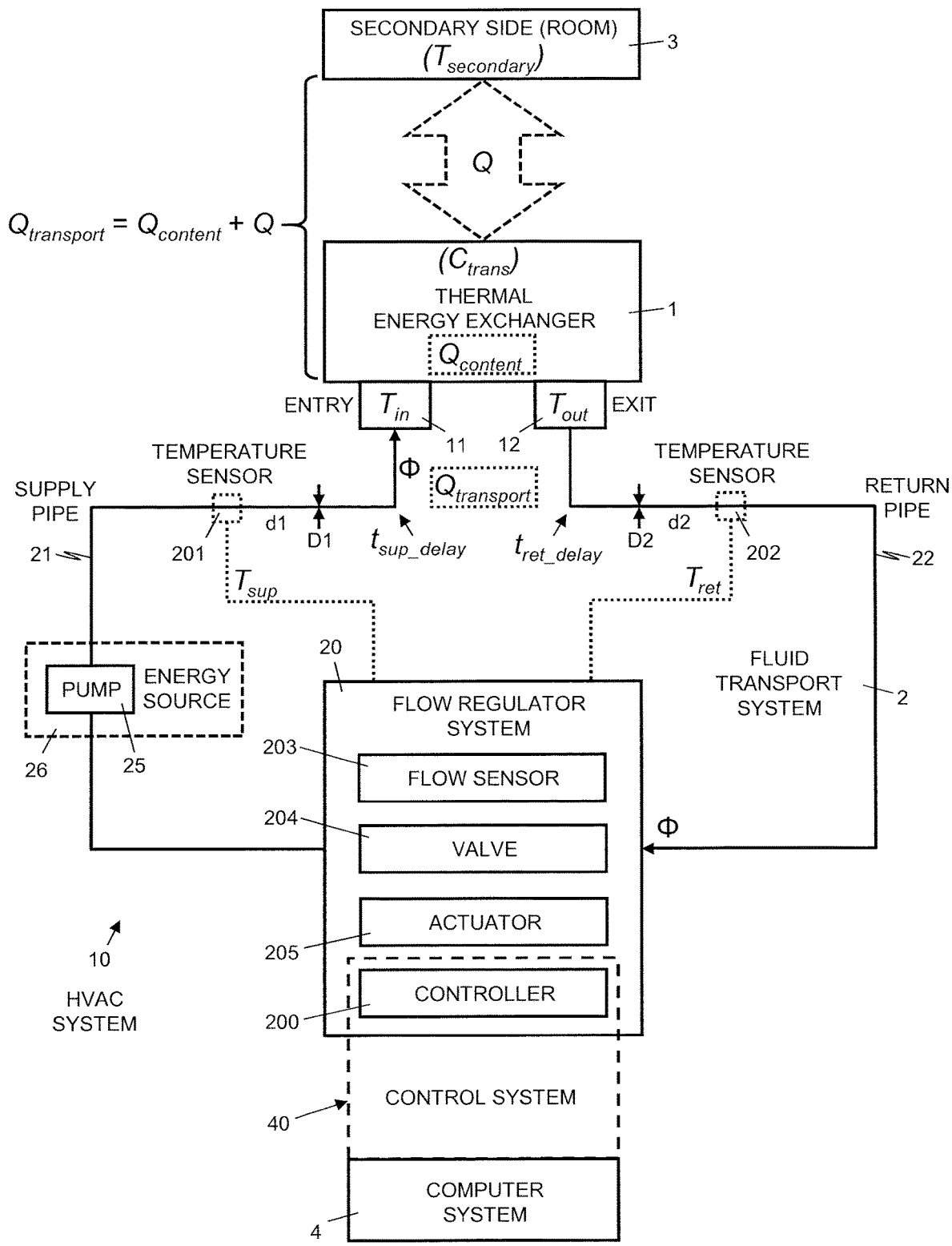
FIG. 1: shows a block diagram illustrating schematically an HVAC system, comprising a thermal energy exchanger and a thermal transfer fluid transport system with a flow regulator system.
Figure 6:
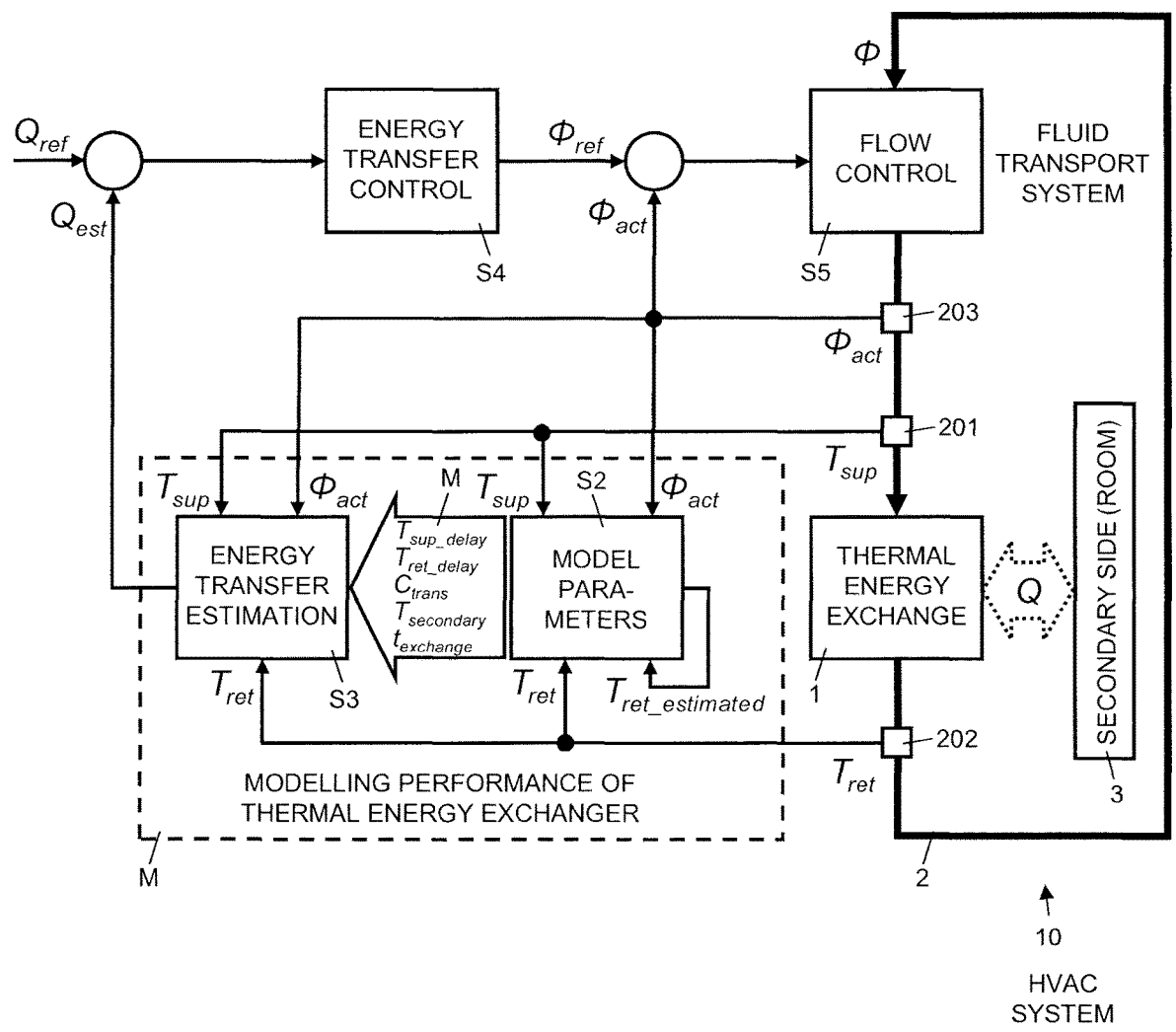
FIG. 6: shows a combined flow and block diagram illustrating an exemplary sequence of steps for controlling energy transfer of a thermal energy exchanger in an HVAC system.

In FIGS. 1-4 and 6, reference numeral 10 refers to an HVAC system (Heating, Ventilation, and Air Conditioning). As illustrated in FIGS. 1 and 6, the HVAC system 10 comprises a thermal energy exchanger 1, e.g. a heat exchanger for heating or a cooling device for cooling. As further illustrated in FIGS. 1 and 6, the HVAC system 10 comprises a fluid transport system 2 for moving a (thermal transfer) fluid, for example a liquid, e.g. water and/or a refrigerant, or a gas, e.g. air, through the thermal energy exchanger 1. As indicated schematically in FIG. 1, the fluid transport system 2 comprises fluid transport lines (pipes or ducts), for conducting a flow of fluid through the thermal energy exchanger 1, a flow regulator system 20 and a pump 25 or fan, respectively, for driving and controlling the flow of the fluid through the thermal energy exchanger 1. As indicated schematically in FIG. 1, the fluid transport system 2 is connected to an energy source 26, e.g. a heating device (furnace, heat pump) or a cooling device (chiller). Specifically, the fluid transport lines comprise a supply pipe 21 (or duct), for feeding the fluid from the flow regulator system 20 to the thermal energy exchanger 1, and a return pipe 22 (or duct), for returning the fluid from the thermal energy exchanger 1 to the flow regulator system 20. As is further illustrated in FIG. 1, the flow regulator system 20 comprises a (motorized) valve 204 or stutter, respectively, with an actuator 205, a controller 200, and a flow sensor 203. The HVAC system 10 further comprises a first temperature sensor 201, arranged in the supply pipe 21, for determining the temperature $T_{sup}$ of the fluid supplied to the thermal energy exchanger 1, and a second temperature sensor 202, arranged in the return pipe 22, for determining the temperature $T_{ret}$ of the fluid returning from the thermal energy exchanger 1. The sensors further comprise a communication module configured for wireless and/or wired data communication (including analog signaling) with the computer system 4 and/or the controller 200.

Figure 2:
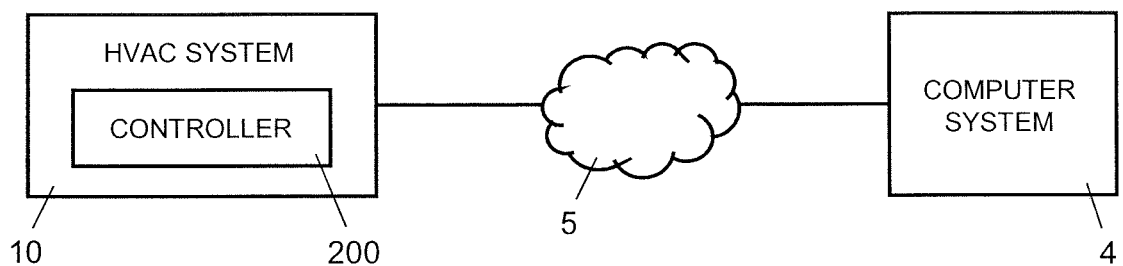
FIG. 2: shows a block diagram illustrating schematically an HVAC system connected via a communication network to a remote computer system.
Figure 3:
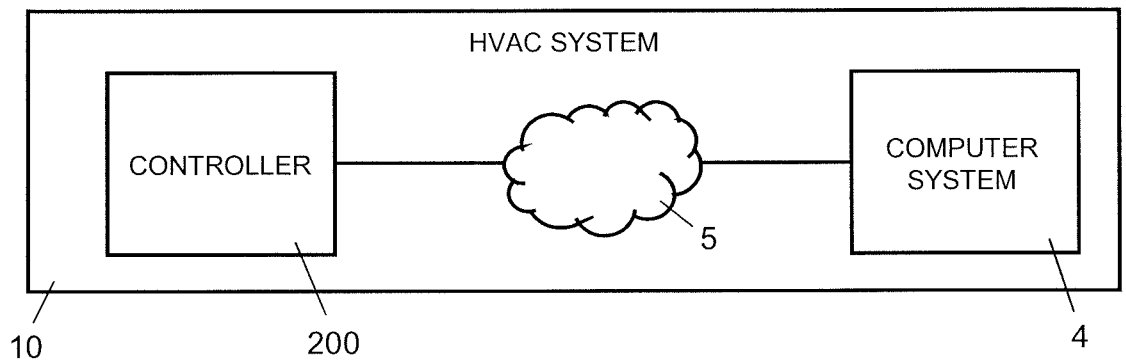
FIG. 3: shows a block diagram illustrating schematically an HVAC system comprising a controller that is connected via a communication network to a local computer system.
Figure 4:
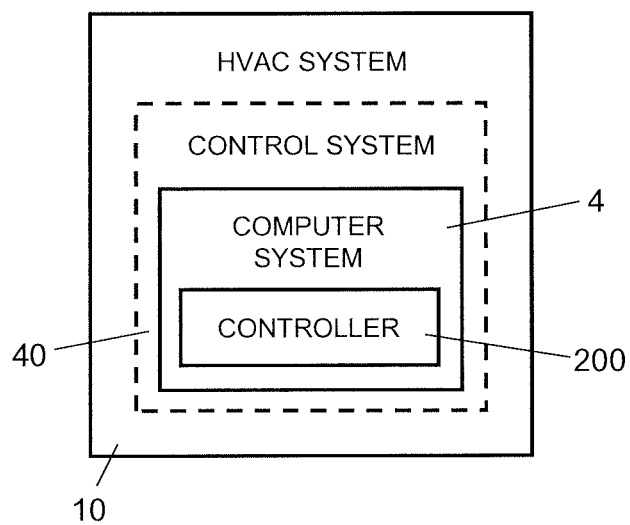
FIG. 4: shows a block diagram illustrating schematically an HVAC system comprising a computer system with a controller.

As illustrated in FIGS. 1-4, the HVAC system 10 comprises or is at least connected via a communication network 5 to a computer system 4. Depending on the embodiment, the computer system 4 comprises one or more operational computers with one or more programmable processors and a data storage system connected to the processor(s). As indicated schematically in FIGS. 1 and 4 by reference numeral 40, the computer system 4 and the controller 200 constitute a control system, particularly a computerized HVAC control system. In the embodiment of FIG. 2, the HVAC system 10 and one or more of its controllers 200 are connected via communication network 5 to a remote computer system 4, e.g. a cloud-based computer system connected to the HVAC system 10 via the Internet. In the embodiment of FIG. 3, the computer system 4 is a part of the HVAC system 10 and is connected via a communication network 5, such as a LAN (Local Area Network) or WLAN (Wireless Local Area Network), to one or more controllers 200 of the HVAC system 10. In the embodiment of FIG. 4, the computer system 4 is a part of the HVAC system 10 and the controller 200 is part of the computer system 4 or the controller 200 constitutes the computer system 4, respectively. The controller 200 includes an electronic circuit, e.g. a programmable processor, an application specific integrated circuit (ASIC), or another logic unit. The controller 200 further comprises a communication module configured for wireless and/or wired data communication with the computer system 4, the temperature sensors 201, 202, the flow sensor 203, and the valve 204 or its actuator, respectively, to control the flow of fluid. The controller 200 and the computer system 4 are configured (programmed) to perform various functions described later in more detail. Depending on the embodiment the communication network 5 includes fixed communication networks or busses and/or mobile communication networks, e.g. WLAN, GSM (Global System for Mobile Communications), UMTS (Universal Mobile Telephone System), or other mobile radio networks.

The controller 200 is configured to control the opening of the valve 204 in response to a setpoint received from a building control system or a user terminal, for example, a setpoint $Q_{ref}$ for thermal energy (or power) to be transferred to a secondary side 3 of the thermal energy exchanger 1, specifically to a fluid oi the secondary side, e.g. to the air that is moved into a room. For the purpose of controlling the energy transfer Q, the controller 200 generates a control signal for the valve 204 or its actuator 24, respectively, based and depending on the received setpoint $Q_{ref}$, as will be described below in more detail.

Figure 5:
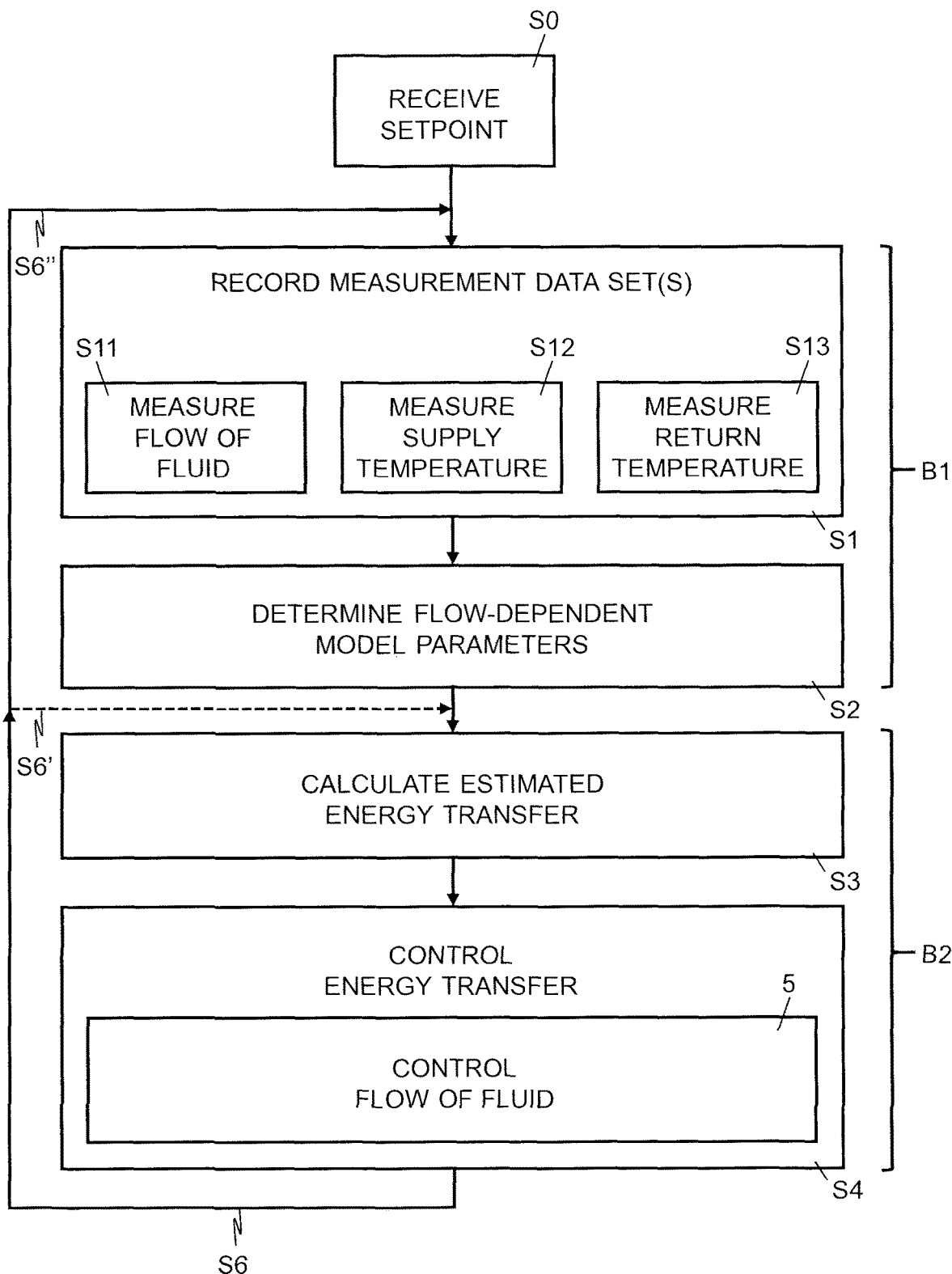
FIG. 5: shows a flow diagram illustrating an exemplary sequence of steps for controlling energy transfer of a thermal energy exchanger in an HVAC system.

In the following paragraphs, described with reference to FIGS. 5 and 6 are possible sequences of steps performed by the control system 40, the computer system 4, and/or controller 200, respectively, for controlling the energy transfer Q of the thermal energy exchanger 1 by adjusting the opening (i.e. the orifice) of the valve 204 to regulate the flow $\Phi$ of the fluid through the thermal energy exchanger 1, responsive to the received setpoint $Q_{ref}$ for thermal energy transfer.

As indicated schematically in FIG. 6 by step S0, the control system 40, i.e. the computer system 4 or the controller 200, receives setpoints or respective commands on an ongoing basis, as submitted by a building control system, a controller or a user terminal; specifically setpoints $Q_{ref}$ or respective commands for thermal energy (or power) to be transferred by the thermal energy exchanger 1. One skilled in the art will understand that as an alternative to controlling the energy transfer, the respective power transfer can be controlled correspondingly, without deviating from the scope of the invention.

As illustrated in FIG. 5, in step S1 the control system 40, i.e. the computer system 4 or the controller 200, respectively, records one or more measurement data sets. Each measurement data set includes for a particular point in time, the measurement time, measurement values of operating parameters related to the thermal energy exchanger 1, specifically a value of the measured flow of fluid $\Phi_{act}$ through the thermal energy exchanger 1, a value of the supply temperature $T_{sup}$ of the fluid, measured in the supply pipe 21 to the thermal energy exchanger 1, and a value of the return temperature $T_{ret}$ of the fluid, measured in the return pipe 22 from the thermal energy exchanger 1. Depending on the configuration and/or mode of operation, a plurality of measurement data sets is recorded and used for off-line batch processing and modelling of the thermal energy exchanger 1, a plurality of measurement data sets are recorded sequentially in an on-line calibration phase following a set measurement protocol with defined system settings for corresponding processing and modelling of the thermal energy exchanger 1, or measurement data sets are recorded on an ongoing basis, on-line during regular operation without a set measurement protocol for continuous processing and modelling of the thermal energy exchanger 1.

As illustrated in FIG. 5, in step S11, the flow of fluid $\Phi_{act}$ is measured; in step S12, the supply temperature $T_{sup}$ is measured; and in step S13, the return temperature $T_{ret}$ is measured. Depending on the embodiment or configuration, the measurement values of the operating parameters are determined for the measurement data sets by the computer system 4 or the controller 200 reading them from sensors, e.g. from temperature sensor 201, temperature sensor 202, and flow sensor 203, or by the sensors reporting them to the computer system 4 or the controller 200. Alternatively, the measurement values of the operating parameters are collected by the controller 200 and later reported to the computer system 4.

In step S2, the control system 40, i.e. the computer system 4 or the controller 200, respectively, determines flow-dependent model parameters M for modelling the thermal energy exchanger 1, specifically, for modelling the performance of the thermal energy exchanger 1. The flow-dependent model parameters M are determined based on the recorded measurement data sets. As illustrated in FIG. 6, the flow-dependent model parameters M include a delay time $t_{sup\_delay}$ associated with the supply pipe 21 and indicating the duration of time it takes for the fluid to move from the first temperature sensor 201 to the entry 11 of the thermal energy exchanger 1; a delay time $t_{ret\_delay}$ associated with the return pipe 22 and indicating the duration of time it takes for the fluid to move from the exit 12 of the thermal energy exchanger 1 to the second temperature sensor 202; an energy transfer coefficient $C_{trans}$ for the thermal energy exchanger 1; a secondary temperature $T_{secondary}$ associated with the secondary side 3 of the thermal energy exchanger 1; an exchange time $t_{exchange}$ of the thermal energy exchanger 1 which indicates the duration of time for the thermal energy exchanger 1 to replace its total volume V content of fluid at a particular flow $\Phi$ ($t_{exchange}=V/\Phi_{act}$). It is pointed out that this exchange time $t_{exchange}=V/\Phi_{act}$ is an approximate value for a thermal time constant of the thermal energy exchanger 1 which indicates the duration of time for the thermal energy exchanger 1 to replace its heat content at a particular flow $\Phi$. Once determined, the flow-dependent model parameters M comprise or define for different values of flow $\Phi$ respective values for the delay time $t_{sup\_delay}$ associated with the supply pipe 21, for the delay time $t_{ret\_delay}$ associated with the return pipe 22, for the energy transfer coefficient $C_{trans}$ of the thermal energy exchanger 1; for the secondary temperature $T_{secondary}$ associated with the secondary side 3 of the thermal energy exchanger 1; and for the exchange time $t_{exchange}$ of the thermal energy exchanger 1. In an embodiment, the flow-dependent model parameters M are stored in a (lookup) table assigned to respective flow values, which makes it possible to retrieve the values of the model parameters M depending on the current flow of fluid $\Phi_{act}$.

In an embodiment where the diameter $D_1$ of the supply pipe 21 or at least the distance $d_1$ between the first temperature sensor 201 aid the entry 11 of the thermal energy exchanger 1 are known, an initial value for the delay time $t_{sup\_delay}$ associated with the supply pipe 21 is defined based on said distance $d_1$ and diameter $D_1$. Likewise, in an embodiment where the diameter $D_2$ of the return pipe 22 or at least the distance $d_2$ between the exit 12 of the thermal energy exchanger 1 and the second temperature sensor 202 are known, an initial value for the delay time $t_{ret\_delay}$ associated with the return pipe 22 is defined based on said distance $d_2$ and diameter $D_2$. Vice versa, the distances $d_1$ and $d_2$, between the first temperature sensor 201 and the entry 11 of the thermal energy exchanger 1 or between the exit 12 of the thermal energy exchanger 1 and the second temperature sensor 202, respectively, can be estimated from derived values of the delay time $t_{sup\_delay}$ associated with the supply pipe 21 or the delay time $t_{ret\_delay}$ associated with the return pipe 22, respectively, if the diameter $D_1$ of the supply pipe 21 and/or the diameter $D_2$ of the return pipe 22 (or a corresponding size of the valve 204) is/are known.

As illustrated in FIG. 1, modelling the thermal energy exchanger 1, or its performance, respectively, takes into consideration that from the energy transport $Q_{transport}$, which represents the energy extracted in the thermal energy exchanger 1 from the fluid flowing through the thermal energy exchanger 1, e portion is stored as an energy content $Q_{content}$ in the thermal energy exchanger 1. Accordingly, the actual energy transfer Q ($Q_{est}$) from the thermal energy exchanger 1 to its secondary side 3 is calculated as the difference of the energy transport $Q_{transport}$ and the energy content $Q_{content}$:

$$Q = Q_{transport} - Q_{content} \quad (1)$$

The energy transport $Q_{transport}$ extracted in the thermal energy exchanger 1 from the fluid depends on the actual flow $\Phi_{act}$, the input temperature $T_{in}$ at the entry 11 of the thermal energy exchanger 1, and the exit temperature $T_{out}$ at the exit 12 of the thermal energy exchanger 1, $c_p$ being a specific heat constant of the fluid and p being a density of the fluid:

$$Q_{transport} = \Phi_{act} \cdot \Delta T = \Phi_{act} \cdot c_p \cdot p \cdot (T_{in} - T_{out}) \quad (2)$$

The input temperature $T_{in}$ is defined by the supply temperature $T_{sup}$ measured in the supply pipe 21 and the delay time $t_{sup\_delay}$ for the fluid to move from the first temperature sensor 201 to the entry 11 of the thermal energy exchanger 1, whereby the value of $T_{in}$ corresponds to the value of the supply temperature $T_{sup}$ measured previously with a delay of delay time $t_{sup\_delay}$:

$$T_{in} = f(T_{sup}, t_{sup\_delay}). \quad (2.1)$$

The output temperature $T_{out}$ is defined by the return temperature $T_{ret}$ measured in the return pipe 22 and the delay time $t_{ret\_delay}$ for the fluid to move from the exit 12 of the thermal energy exchanger 1 to the second temperature sensor 202, whereby the measured value of the return temperature $T_{ret}$ corresponds to the preceding value of the output temperature $T_{out}$ at the time $t=t-t_{ret\_delay}$ in the past:

$$T_{out} = f(T_{ret}, t_{ret\_delay}). \quad (2.2)$$

The energy content $Q_{content}$ stored in the thermal energy exchanger 1 is defined by a volume V (content) of the thermal energy exchanger 1 and a primary temperature $T_{primary}$ of the thermal energy exchanger 1, $c_p$ being the specific heat constant of the fluid and p being the density of the fluid:

$$Q_{content} = V \cdot c_p \cdot p \cdot T_{primary}. \quad (3)$$

The primary temperature $T_{primary}$ of the thermal energy exchanger 1 is calculated as an average value from the input temperature $T_{in}$ and the exit temperature $T_{out}$ of the thermal energy exchanger 1:

$$T_{primary} = 1/2(T_{in} + T_{out}). \quad (2.1)$$

The volume V (content) of the thermal energy exchanger 1 is defined by the exchange time $t_{exchange}$ of the thermal energy exchanger 1 and the actual flow $\Phi_{act}$:

$$V = t_{exchange} \cdot \Phi_{act} \quad (3.2)$$

The energy transfer Q (Qest) from the thermal energy exchanger 1 to its secondary side 3 is defined by the primary temperature $T_{primary}$ of the thermal energy exchanger 1, the secondary temperature $T_{secondary}$ of the thermal energy exchanger 1, and the energy transfer coefficient $C_{trans}$ for the thermal energy exchanger 1:

$$Q = C_{trans} \cdot (T_{primary} - T_{secondary}) \quad (4)$$

Using relations (1)-(4), the control system 40, i.e. the computer system 4 or the controller zoo, respectively, determines the flow-dependent model parameters M, including supply delay time $t_{sup\_delay}$, return delay time $t_{ret\_delay}$, energy transfer coefficient $C_{trans}$, secondary temperature $T_{secondary}$, and exchange time $t_{exchange}$, from the recorded data sets with the measured operating parameters, including flow $\Phi_{act}$, supply temperature $T_{sup}$, and return temperature $T_{ret}$. Using a plurality of data sets with the measured operating parameters, the control system 40, i.e. the computer system 4 or the controller 200, respectively, defines a set of equations for the relations (1)-(4) for determining the flow-dependent model parameters M. Specifically, the control system 40, i.e. the computer system 4 or the controller 200, respectively, uses initial estimated values for the flow-dependent model parameters M to determine an estimated value for the return temperature $T_{ret\_estimated}$ and iteratively improves the flow-dependent model parameters M by applying an optimization function to minimize the error (e.g. mean squared error, MSE) or difference (e.g. mean square difference, MSD) between the estimated return temperature $T_{ret\_estimated}$ and the actually measured return temperature $T_{ret}$.

In accordance with the configuration and/or mode for recording the measurement data sets and determining the model parameters M in off-line batch processing, on-line calibration phase, and/or on an ongoing basis, in step S3, the control system 40, i.e. the computer system 4 or the controller 200, respectively, uses the (current) model parameters M to calculate an estimated value of the energy transfer $Q_{est}$.

In step S4, the controller zoo determines a target flow $\Phi_{ref}$ based on a comparison of the setpoint $Q_{ref}$ for thermal energy (or power) to be transferred and the currently estimated value of the energy transfer $Q_{est}$.

In step S5, the controller zoo controls the flow through thermal energy exchanger 1 by adjusting the opening (i.e. the orifice) of the valve 204 to regulate the flow $\Phi$ of the fluid through the thermal energy exchanger 1 based on a comparison of the determined target flow $\Phi_{ref}$ and the currently measured actual flow $\Phi_{act}$.

As indicated schematically, in step S6, the control system 40, i.e. the computer system 4 or the controller 200, respectively, continues processing in step S1 or step S3, respectively. As depicted by step S6", in the on-line mode of operation with continuous recording of measurement data sets, processing is continued in step S1 by performing the steps S1 and S2 of block $B_1$ for determining the model parameters M; whereas in the off-line batch processing or on-line calibration phase modes, processing continues in step S3 by performing steps S3 and S4 of block $B_2$ for controlling the energy transfer. One skilled in the art will understand that block $B_1$ for determining the model parameters M may be executed periodically, on request, and/or depending on defined system criteria.

It should be noted that, in the description, the sequence of the steps has been presented in a specific order, one skilled in the art will understand, however, that the order of at least some of the steps could be altered, without deviating from the scope of the invention.

The invention claimed is:
1. A control system for controlling energy transfer of a thermal energy exchanger of an HVAC system, the control system comprising at least one processor configured to:
obtain from a flow sensor, a measured flow of fluid through the thermal energy exchanger;

obtain from a first temperature sensor, a supply temperature of the fluid in a supply pipe connected to an entry of the thermal energy exchanger;

obtain from a second temperature sensor, a return temperature of the fluid in a return pipe connected to an exit of the thermal energy exchanger;

determine flow-dependent model parameters for modelling performance of the thermal energy exchanger, using one or more measurement data sets, each measurement data set including for a respective measurement time a value of the measured flow of fluid, a value of the measured supply temperature of the fluid, and a value of the measured return temperature of the fluid;

calculate an estimated energy transfer of the thermal energy exchanger, using the flow-dependent model parameters, by determining an estimated energy transport, extracted in the thermal energy exchanger from the fluid, by determining an input temperature of the thermal energy exchanger, using the measured supply temperature and a delay time in the supply pipe for the fluid to move from the first temperature sensor to the thermal energy exchanger, determining an output temperature of the thermal energy exchanger, using the measured return temperature and a delay time in the return pipe for the fluid to move from the thermal energy exchanger to the second temperature sensor, and calculating the estimated energy transport from the measured flow of fluid, the input temperature of the thermal energy exchanger, and the output temperature of the thermal energy exchanger;

determining an energy content stored in the thermal energy exchanger, and calculating the estimated energy transfer as a difference from the energy transport and the energy content; and control the energy transfer of the thermal energy exchanger by regulating the flow of fluid through the thermal energy exchanger, using the estimated energy transfer.

2. The control system of claim 1, wherein the processor is further configured to determine with the flow-dependent model parameters a delay time in the supply pipe for the fluid to move from the first temperature sensor to the thermal energy exchanger, and determining a delay time in the return pipe for the fluid to move from the thermal energy exchanger to the second temperature sensor.

3. The control system of one of claim 1, wherein the processor is further configured to determine with the flow-dependent model parameters an energy transfer coefficient for the thermal energy exchanger.

4. The control system of one of claim 1, wherein the processor is further configured to determine with the flow-dependent model parameters a secondary temperature associated with a secondary side of the thermal energy exchanger.

5. The control system of one of claim 1, wherein the processor is further configured to determine with the flow-dependent model parameters an exchange time for the fluid to replace a total fluid content of the thermal energy exchanger.

6. The control system of one of claim 1, wherein the processor is further configured to determine the flow-dependent model parameters by determining an estimated return temperature of the fluid in the return pipe, and setting the flow-dependent model parameters to minimize a difference between the estimated return temperature and the measured return temperature.

7. The control system of one of claim 1, wherein the processor is further configured to receive a target energy transfer, and control the energy transfer by regulating the flow of fluid through the thermal energy exchanger based on a comparison of the target energy transfer and the estimated energy transfer.

8. The control system of claim 7, wherein the processor is further configured to regulate the flow of fluid through the thermal energy exchanger by determining a target flow based on the comparison of the target energy transfer and the estimated energy transfer, and regulate the flow of fluid through the thermal energy exchanger based on a comparison of the target flow and the measured flow of fluid.

9. A control system for controlling energy transfer of a thermal energy exchanger of an HVAC system, the control system comprising at least one processor configured to:

obtain from a flow sensor, a measured flow of fluid through the thermal energy exchanger;

obtain from a first temperature sensor, a supply temperature of the fluid in a supply pipe connected to an entry of the thermal energy exchanger;

obtain from a second temperature sensor, a return temperature of the fluid in a return pipe connected to an exit of the thermal energy exchanger;

determine flow-dependent model parameters for modelling performance of the thermal energy exchanger, using one or more measurement data sets, each measurement data set including for a respective measurement time a value of the measured flow of fluid, a value of the measured supply temperature of the fluid, and a value of the measured return temperature of the fluid, wherein determining the flow-dependent model parameters comprises the control system determining a delay time in the supply pipe for the fluid to move from the first temperature sensor to the thermal energy exchanger, and determining a delay time in the return pipe for the fluid to move from the thermal energy exchanger to the second temperature sensor;

calculate an estimated energy transfer of the thermal energy exchanger, using the flow-dependent model parameters; and control the energy transfer of the thermal energy exchanger by regulating the flow of fluid through the thermal energy exchanger, using the estimated energy transfer.

10. The control system of one of claim 9, wherein the processor is further configured to determine with the flow-dependent model parameters an energy transfer coefficient for the thermal energy exchanger.

11. The control system of one of claim 9, wherein the processor is further configured to determine with the flow-dependent model parameters a secondary temperature associated with a secondary side of the thermal energy exchanger.

12. The control system of one of claim 9, wherein the processor is further configured to determine the flow-dependent model parameters by determining an estimated return temperature of the fluid in the return pipe, and setting the flow-dependent model parameters such as to minimize a difference between the estimated return temperature and the measured return temperature.

13. The control system of one of claim 9, wherein the processor is further configured to receive a target energy transfer, and control the energy transfer by regulating the flow of fluid through the thermal energy exchanger based on a comparison of the target energy transfer and the estimated energy transfer.

14. The control system of claim 7, wherein the processor is further configured to regulate the flow of fluid through the thermal energy exchanger by determining a target flow based on the comparison of the target energy transfer and the estimated energy transfer, and regulate the flow of fluid through the thermal energy exchanger based on a comparison of the target flow and the measured flow of fluid.

15. A control system for controlling energy transfer of a thermal energy exchanger of an HVAC system, the control system comprising at least one processor configured to:
   obtain from a flow sensor, a measured flow of fluid through the thermal energy exchanger;
   obtain from a first temperature sensor, a supply temperature of the fluid in a supply pipe connected to an entry of the thermal energy exchanger;
   obtain from a second temperature sensor, a return temperature of the fluid in a return pipe connected to an exit of the thermal energy exchanger;
   determine flow-dependent model parameters for modelling performance of the thermal energy exchanger, using one or more measurement data sets, each measurement data set including for a respective measurement time a value of the measured flow of fluid, a value of the measured supply temperature of the fluid, and a value of the measured return temperature of the fluid, and determining with the flow-dependent model parameters an exchange time for the fluid to replace a total fluid content of the thermal energy exchanger;
   calculate an estimated energy transfer of the thermal energy exchanger, using the flow-dependent model parameters; and
   control the energy transfer of the thermal energy exchanger by regulating the flow of fluid through the thermal energy exchanger, using the estimated energy transfer.

16. The control system of one of claim 9, wherein the processor is further configured to determine with the flow-dependent model parameters an energy transfer coefficient for the thermal energy exchanger.

17. The control system of one of claim 9, wherein the processor is further configured to determine with the flow-dependent model parameters a secondary temperature associated with a secondary side of the thermal energy exchanger.

18. The control system of one of claim 9, wherein the processor is further configured to determine the flow-dependent model parameters by determining an estimated return temperature of the fluid in the return pipe, and setting the flow-dependent model parameters such as to minimize a difference between the estimated return temperature and the measured return temperature.

19. The control system of one of claim 9, wherein the processor is further configured to receive a target energy transfer, and control the energy transfer by regulating the flow of fluid through the thermal energy exchanger based on a comparison of the target energy transfer and the estimated energy transfer.

20. The control system of claim 7, wherein the processor is further configured to regulate the flow of fluid through the thermal energy exchanger by determining a target flow based on the comparison of the target energy transfer and the estimated energy transfer, and regulate the flow of fluid through the thermal energy exchanger based on a comparison of the target flow and the measured flow of fluid.

* * * * *